United States Patent [19]

Furuta

[11] Patent Number: 5,699,133
[45] Date of Patent: Dec. 16, 1997

[54] LIQUID CRYSTAL SHUTTER HAVING A SPECIFIED ZERO VOLTAGE TIME VISCOSITY PRODUCT OR A SPECIFIED DRIVING FREQUENCY

[75] Inventor: Yoshihiro Furuta, Kobe, Japan

[73] Assignee: Sanyo Electric Co., Ltd., Osaka, Japan

[21] Appl. No.: 654,919

[22] Filed: May 29, 1996

[30] Foreign Application Priority Data

May 30, 1995 [JP] Japan .................. 7-132337

[51] Int. Cl.⁶ .................. G02F 1/1335; G02F 1/133; G02F 1/13
[52] U.S. Cl. .................. 349/13; 349/15; 349/33; 349/180
[58] Field of Search .................. 349/13, 15, 33, 349/179, 180

[56] References Cited

U.S. PATENT DOCUMENTS

| | | | |
|---|---|---|---|
| 4,143,947 | 3/1979 | Aftergut et al. | 349/179 |
| 4,812,258 | 3/1989 | Krause et al. | 252/299.61 |
| 4,944,577 | 7/1990 | Yoshida et al. | 349/181 |
| 5,048,933 | 9/1991 | Asano | 349/180 |
| 5,402,191 | 3/1995 | Dean et al. | 359/864 |

FOREIGN PATENT DOCUMENTS

| | | |
|---|---|---|
| 52-79948 | 7/1977 | Japan . |
| 62-916 | 1/1987 | Japan . |
| 62-050812 | 3/1987 | Japan . |
| 62-125331 | 6/1987 | Japan . |
| 5-210123 | 8/1993 | Japan . |

Primary Examiner—William L. Sikes
Assistant Examiner—Walter Malinowski
Attorney, Agent, or Firm—Nikaido, Marmelstein, Murray & Oram LLP

[57] ABSTRACT

A liquid crystal shutter has a liquid crystal layer which is made of a liquid crystal material prepared from a nematic liquid crystal. The ratio d/p of the thickness d of the liquid crystal layer to the chiral pitch p of the liquid crystal material and a twist angle θ which is set by a pair of alignment layers for liquid crystal molecules of the liquid crystal layer satisfy the relation of θ/360°<d/p.

14 Claims, 12 Drawing Sheets

5,699,133

LIQUID CRYSTAL SHUTTER HAVING A SPECIFIED ZERO VOLTAGE TIME VISCOSITY PRODUCT OR A SPECIFIED DRIVING FREQUENCY

BACKGROUND OF THE INVENTION

1. Field of the Invention

The present invention relates to a liquid crystal shutter which alternates an open state having high light transmission and a closed state having low light transmission at a high speed.

2. Description of the Background Art

In a known liquid crystal shutter, a voltage exceeding a threshold voltage is applied to a nematic liquid crystal in a constant cycle to alternately implement an open state having high light transmission and a closed state having low light transmission. The nematic liquid crystal is generally employed for an STN mode or a TN mode. The STN mode is generally twisted at an angle of at least 180°. The liquid crystal shutter is generally held by a pair of transparent substrates, so that the voltage is applied thereto by transparent electrodes which are formed on the transparent substrates. Alignment layers are formed on the transparent electrodes, so that liquid crystal molecules are twisted at a prescribed angle by the alignment layers.

When voltage is not applied, the liquid crystal molecules are twisted between the alignment layers to be at a prescribed twist angle. In case of a liquid crystal shutter employing an STN type liquid crystal having a twist angle of 270°, the liquid crystal molecules are twisted at the angle of 270° by intermolecular force between the alignment layers. When a voltage exceeding the threshold voltage is applied to the liquid crystal molecules in such a state, the liquid crystal molecules are oriented perpendicularly to an electric field direction while vertically directing the major axes thereof, if the anisotropy of dielectric constant of the liquid crystal is positive($\Delta\epsilon$>0). The open state having high light transmission and the closed state having low light transmission are implemented by utilizing such a change in state of the liquid crystal molecules caused by voltage application.

In general, two polarizing plates are provided on both sides of the liquid crystal layer. In an NO (normally open) mode of maximizing the light transmission with application of no voltage, the polarization axes of the polarizing plates are provided to be parallel or perpendicular to rubbing directions of the approximate alignment layers. Thus, in the STN type liquid crystal having a twist angle of 270°, the two polarizing plates are so provided that the polarization axes thereof are perpendicular to each other. In such an NO mode, the light transmission is increased and the liquid crystal shutter enters an open state when voltage is not applied to the liquid crystal. When a voltage is applied to the liquid crystal, on the other hand, the light transmission is reduced and the liquid crystal shutter enters a closed state.

In an NC (normally closed) mode, on the other hand, polarizing plates are so arranged that the polarization axes thereof are parallel to each other. Thus, the liquid crystal shutter enters a closed state having low light transmission when voltage is not applied, while entering an open state having high light transmission upon application of a voltage.

FIG. 16 illustrates the relation between voltages which are applied to a conventional STN type liquid crystal shutter of an NO mode in a constant cycle for alternating an open state and a closed state and light transmission. Referring to FIG. 16, the voltage applied to the liquid crystal and the light transmission of visible light of the liquid crystal are shown at (a) and (b) respectively. As shown at (a) in FIG. 16, application of a voltage is started at a start time 4, so that a positive voltage is first applied for a voltage application period 5 of 16.7 msec. Then, voltage is not applied for a zero voltage period 7 of 16.7 msec. Then, a negative voltage is applied for another voltage application period 5 of 16.7 msec. Then, another zero voltage period 7 is provided. Thus, reverse voltages are alternately applied in a constant cycle. The frequency f of the applied voltages is 1 sec./(16.7 msec.+16.7 msec.)=30 Hz.

As shown at (b) in FIG. 16, the light transmission 6 is reduced in the voltage application period 5 to attain an open state, while the same is increased in the zero voltage period 7 to attain an open state. When the voltage application period 5 is completed to shift to the zero voltage period 7 in the conventional liquid crystal shutter, the response of the light transmission 6 is so slow that the same is disadvantageously slowly increased in the zero voltage period 7, as shown at (b) in FIG. 16. Due to such slow increase of the light transmission 6 in the zero voltage period 7, the average value of the light transmission 6 in the zero voltage period 7 is smaller than that before the start time 4. Upon driving, therefore, the liquid crystal shutter is disadvantageously darkened in the open state as compared with the state before driving. Specifically, a dark picture portion is observed in an upper area of a picture display, when the liquid crystal shutter is used in a manner of synchronizing the open state thereof with one vertical scanning interval of the picture display.

The liquid crystal shutter shown in FIG. 16 is of an NO mode. In case of a liquid crystal shutter of an NC mode, on the other hand, the same cannot be sufficiently darkened in a zero voltage period.

SUMMARY OF THE INVENTION

A principal object of the present invention is to provide a liquid crystal shutter of an NO mode comprising a liquid crystal which is at a high speed of response in shifting from a closed state to an open state with high light transmission in the open state, or a liquid crystal shutter of an NC mode comprising a liquid crystal which is at a high speed of response in shifting from an open state to a closed state with low light transmission in the closed state.

Another object of the present invention is to provide a liquid crystal shutter which can reduce coloring of transmitted light.

Still another object of the present invention is to provide a liquid crystal shutter which can reduce coloring of transmitted light with no requirement for a retardation plate.

The liquid crystal shutter according to the present invention comprises a pair of transparent substrates, a pair of transparent electrodes which are provided inside the pair of transparent substrates to be opposed to each other, a liquid crystal layer which is arranged between the pair of transparent electrodes, and a pair of alignment layers which are provided on both sides of the liquid crystal layer for aligning liquid crystal molecules forming the liquid crystal layer. A liquid crystal material forming the liquid crystal layer is prepared from a nematic liquid crystal, and the ratio d/p of the thickness d of the liquid crystal layer to the chiral pitch p of the liquid crystal material and a twist angle $\theta$ which is set by the pair of alignment layers for the liquid crystal molecules of the liquid crystal layer satisfy the relation of $\theta/360° < d/p$.

The thickness d of the liquid crystal layer can be adjusted by adjusting the distance between the pair of transparent substrates. The chiral pitch p of the liquid crystal material is a distance which is necessary for attaining single rotation of the long axes of the liquid crystal molecules toward the thickness direction of the cell. The chiral pitch p can be adjusted by the amount of addition of an optically active substance (chiral substance) having asymmetric carbon atoms in molecules to the nematic liquid crystal or the kind of the optically active substance. The twist angle θ can be adjusted by adjusting the respective alignment directions of the pair of alignment layers.

The liquid crystal shutter according to the present invention is so driven as to alternate a voltage application period of applying a voltage exceeding the threshold voltage of the liquid crystal layer and a zero voltage period of applying no voltage. The applied voltage in the voltage application period, which is varied with the type of the liquid crystal material forming the liquid crystal layer, the thickness of the liquid crystal layer and the like, is at least twice the threshold voltage, in general.

An embodiment applying the present invention to a NO mode is now described.

According to a preferred embodiment of the present invention, the voltage application period and the zero voltage period correspond to a closed state having low light transmission and an open state having high light transmission respectively, and the thickness d of the liquid crystal layer, the chiral pitch p of the liquid crystal material and the twist angle θ are so set that the light transmission in the zero voltage period is higher than that in an initial state before driving of the liquid crystal shutter.

In a more preferred embodiment of the present invention, a frequency f of the applied voltage having a cycle defined by the voltage application period and the zero voltage period is so set that the light transmission in the zero voltage period is not reduced to that in the initial state before driving of the liquid crystal shutter within the zero voltage period.

In a more preferred embodiment of the present invention, the frequency f of the applied voltage having a cycle defined by the voltage application period and the zero voltage period is so set that the light transmission in the zero voltage period is not substantially reduced in the zero voltage period.

In the present invention, the ratio f/(K33/K11) of the frequency f of the applied voltage having a cycle defined by the voltage application period and the zero voltage period to the elastic coefficient ratio K33/K11 of the liquid crystal material is set in excess of a prescribed value, so that the light transmission in the zero voltage period can be higher than that in the initial state.

In the present invention, the product t·η of the zero voltage period t and viscosity η of the liquid crystal material is set to be less than a prescribed value, so that the light transmission in the zero voltage period can be higher than that in the initial state.

In the liquid crystal shutter according to the present invention, it is conceivable that the liquid crystal molecules forming the liquid crystal layer are substantially perpendicularly oriented at a twist angle of 0° in the voltage application period while being twisted at an angle exceeding the twist angle θ in the zero voltage period. It is conceivable that the light transmission in the zero voltage period exceeds that in the initial state due to such twisting of the liquid crystal molecules at the angle exceeding the twist angle θ in the zero voltage period.

The present invention can be applied to right and left eye shutters of liquid crystal shutter glasses. The right and left eye shutters are driven to be alternately closed in a prescribed cycle. Such liquid crystal shutter glasses can be combined with a picture display unit alternately displaying pictures for the right and left eyes. Namely, the liquid crystal shutter glasses are so driven as to close the right eye shutter when the picture display unit displays a left eye picture while closing the left eye shutter when the picture display unit displays a right eye picture, so that the pictures displayed on the picture display unit are observed through the liquid crystal glasses. Thus, it is possible to stereoscopically observe the pictures, for example, by observing the right and left eye pictures only with the right and left eyes respectively.

According to the present invention, the speed of response of the liquid crystal can be increased in shifting from the voltage application period to the zero voltage period. In case of the NO mode, the light transmission in the zero voltage period can be increased as compared with the conventional liquid crystal shutter.

According to the present invention, further, coloring of transmitted light can be reduced. Thus, it is not necessary to employ a retardation plate, which has been necessary in general, for example. Therefore, the number of components included in the liquid crystal shutter can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
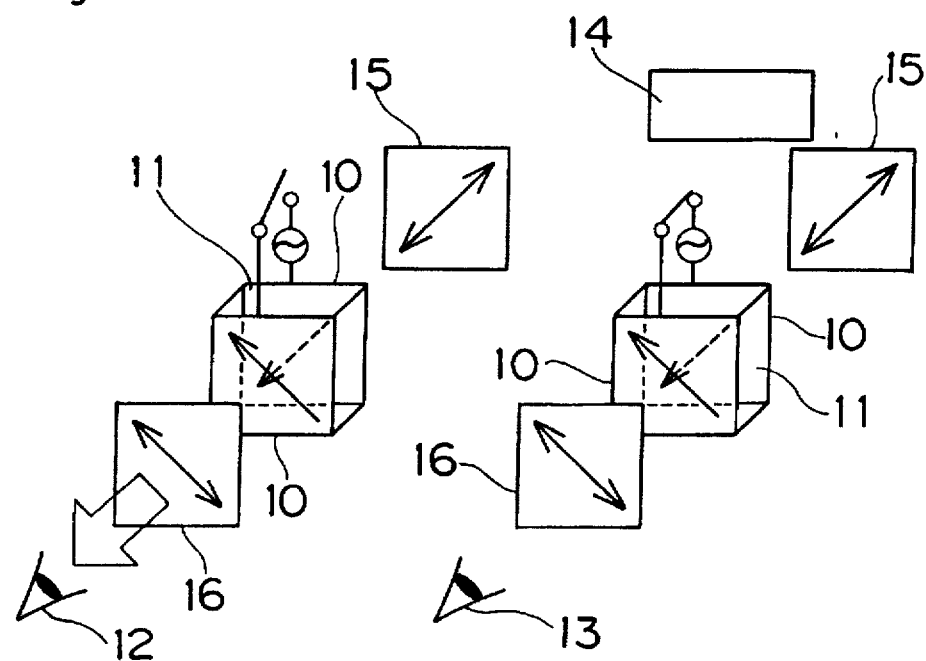
FIG. 5 is a model diagram for illustrating liquid crystal shutters according to an embodiment of the present invention.

FIG. 5 is a model diagram showing a picture display observation system according to an embodiment of the present invention. In the picture display observation system shown in FIG. 5, liquid crystal shutter glasses consisting of liquid crystal shutters for right and left eyes 13 and 12 are employed for observing pictures which are displayed on a display unit 14. Both of the liquid crystal shutters for the right and left eyes 13 and 12 are prepared from inventive shutters.

In each of these shutters, an STN type liquid crystal layer 11 is arranged between a pair of transparent electrodes 10. The transparent electrodes 10 are provided inside of a pair of transparent substrates (not shown), to be opposed to each other. Alignment layers are provided inside the transparent electrodes 10, for controlling the twist angle of liquid crystal molecules forming the STN type liquid crystal layer 11.

Figure 6A:
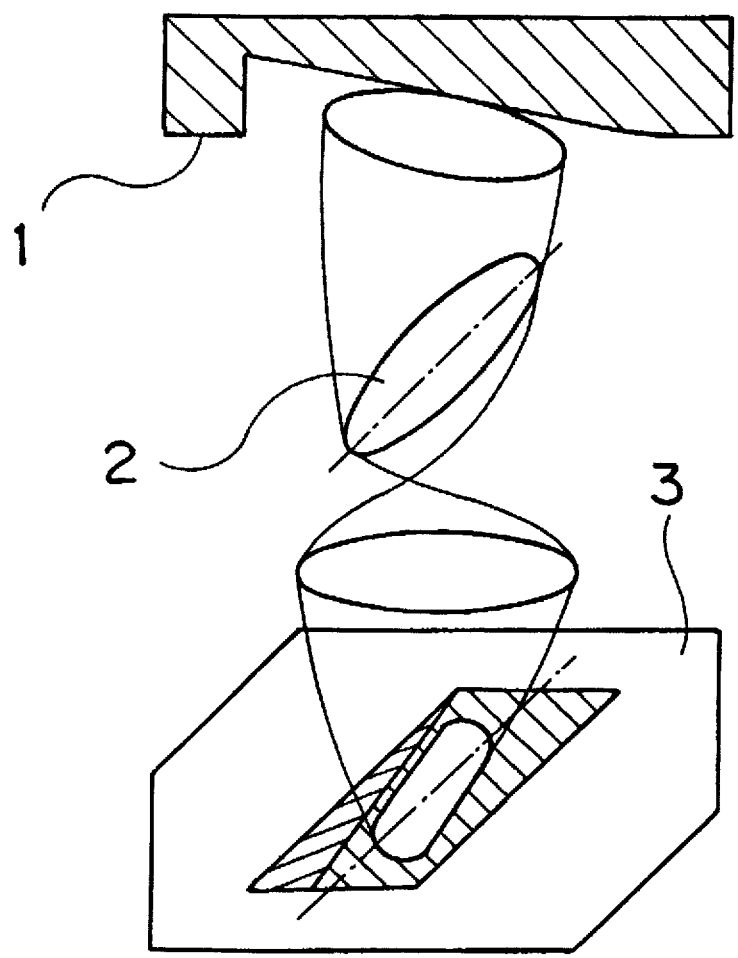
FIGS. 6A and 6B are perspective views for illustrating a twisted state of an STN type liquid crystal.
Figure 6B:
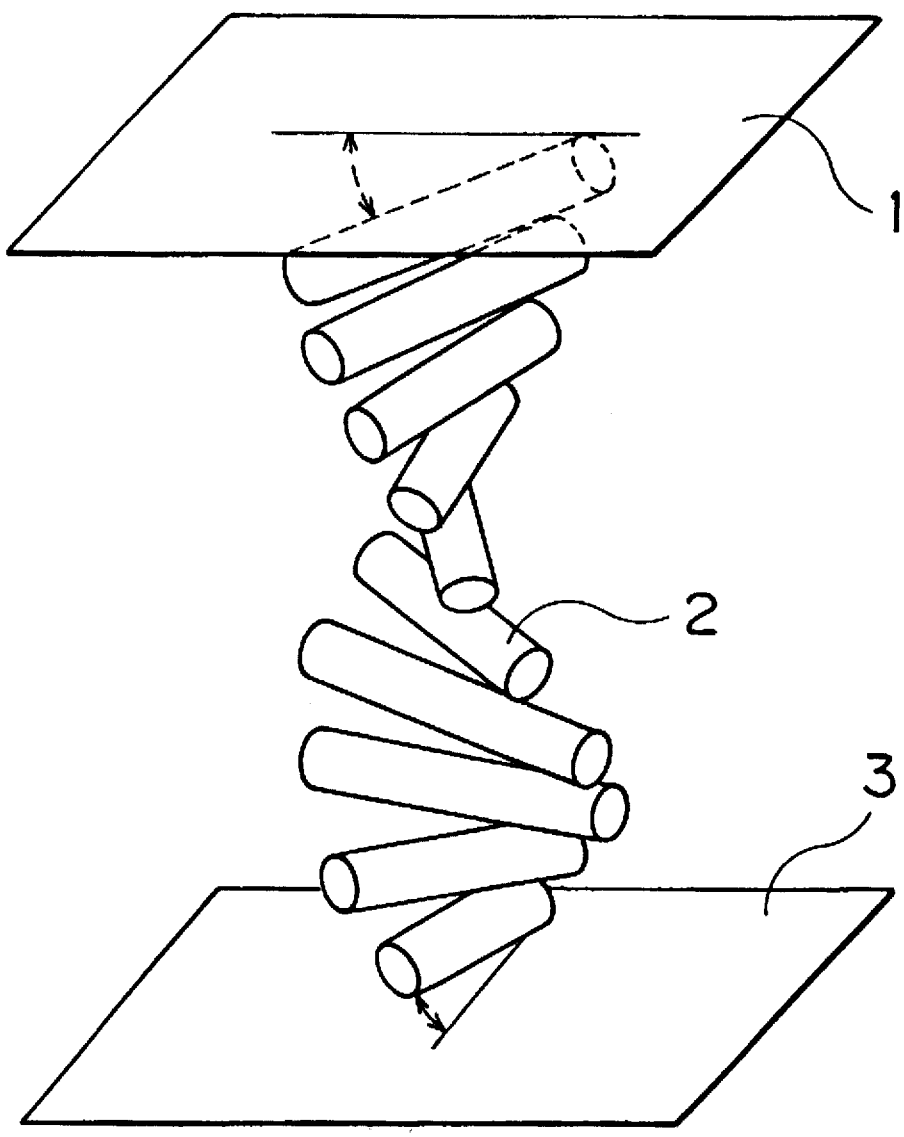

FIGS. 6A and 6B are perspective views showing twisted states of such liquid crystal molecules 2. As shown in FIGS. 6A and 6B, the liquid crystal molecules 2 are arranged between upper and lower alignment layers 1 and 3. The upper alignment layer 1 is rightwardly rubbed in FIG. 6A, whereby the alignment direction of each liquid crystal molecule 2 is fixed along the alignment layer 1 so that each liquid crystal molecule 2 is aligned at a constant angle of inclination on the alignment layer 1. This angle is generally called a pretilt angle.

On the other hand, the lower alignment layer 3 is rubbed from a lower portion of this side toward an upper portion of the depth in the figure. Therefore, each liquid crystal molecule 2 provided on the lower alignment layer 3 is aligned, similarly to that on the upper alignment layer 1.

When voltage is not applied, each liquid crystal molecule 2 is twisted from a position along the alignment direction of the lower alignment layer 3 to that along the alignment direction of the upper alignment layer 1, as shown in FIGS. 6A and 6B. Thus, the twist angle θ can be set by the alignment directions of the upper and lower alignment layers 1 and 3. In general, the STN type liquid crystal is set to be at a twist angle of at least 180°. In the embodiment shown in FIGS. 6A and 6B, a twist angle is set to 270° counterclockwise.

The liquid crystal material has a specific chiral pitch p. In general, the thickness d of the liquid crystal layer, the chiral pitch p of the liquid crystal material and the twist angle θ are so set that the ratio d/p of the thickness d of the liquid crystal layer to the chiral pitch p of the liquid crystal material and the twist angle θ are in the relation of θ/360°=d/p. The chiral pitch p of the liquid crystal material is adjusted by adjusting the kind and the amount of addition of a chiral substance, as described above.

According to the present invention, the thickness d of the liquid crystal layer, the chiral pitch p of the liquid crystal material and the twist angle θ are set to be in the relation of θ/360°<d/p.

Referring again to FIG. 5, the thickness d, the chiral pitch p and the twist angle θ are set in the aforementioned manner in each of the STN type liquid crystal layers 11 employed in this embodiment. A power source is connected to each STN type liquid crystal layer 11 in an on-off controllable state, so that a prescribed voltage is applied by the transparent electrodes 10. Rear and front polarizing plates 15 and 16 are arranged on both sides of each STN type liquid crystal layer 11. The rear polarizing plate 15 is so arranged that its polarization axis is parallel or perpendicular to the rubbing direction of the alignment layer on the rear polarizing plate 15 side. On the other hand, the front polarizing plate 16 is so arranged that its polarization axis is parallel or perpendicular to the alignment direction of the alignment layer on the front polarizing plate 16 side. In this embodiment, therefore, each liquid crystal shutter is that of an NO mode.

The liquid crystal shutters having the aforementioned structure are provided for the right and left eyes 13 and 12 respectively. The liquid crystal shutters for the right and left eyes 13 and 12 are so driven that a voltage is applied to one of the STN type liquid crystal layers 11 while voltage is not applied to the other one, thereby alternately implementing open and closed states.

The display unit 14 is adapted to alternately display right and left eye pictures. This display unit 14 is selected from picture displays such as a CRT, an LCD and a projector, for example.

Figure 1:
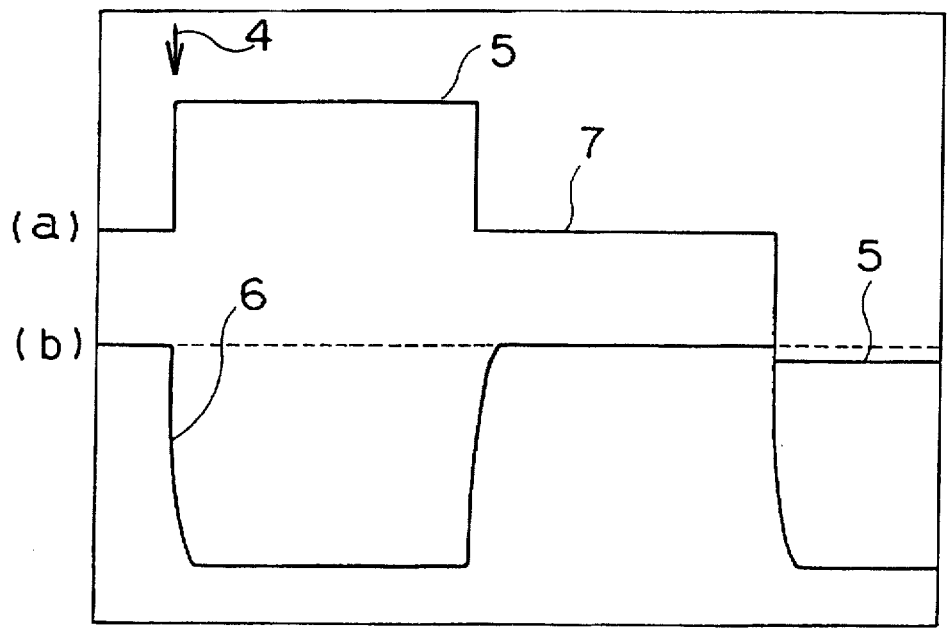
FIG. 1 illustrates changes of voltages applied to a liquid crystal in a liquid crystal shutter according to Example of the present invention and following changes of light transmission.

FIG. 1 illustrates changes of voltages applied to the liquid crystal in Example of each liquid crystal shutter shown in FIG. 5 and following changes of light transmission in case of setting the thickness d of the liquid crystal layer at 8 μm, the chiral pitch p of the liquid crystal material at 10 μm and the twist angle θ at 270°. Thus, the ratio d/p was 8/10=0.8, which was greater than 270°/360 °=0.75, to satisfy the relation of θ/360°<d/p.

Each of the voltage application and zero voltage periods 5 and 7 was for 16.7 msec. In the voltage application period 5, positive and negative voltages were alternately applied. Therefore, the frequency f was 1 sec./(16.7 msec.+16.7 msec.)=30 Hz.

Figure 16:
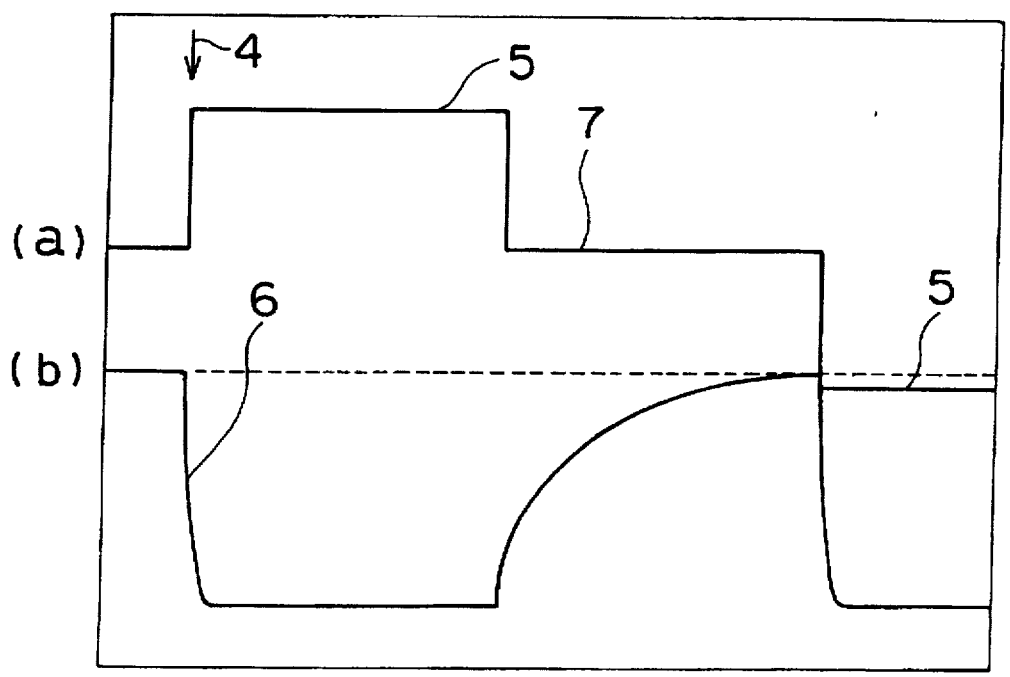
FIG. 16 illustrates changes of voltages applied to a liquid crystal in a conventional liquid crystal shutter and following changes of light transmission.

As shown in FIG. 1, light transmission 6 was more steeply changed in shifting from the voltage application period 5 to the zero voltage period 7, as compared with the conventional case shown in FIG. 16. The response time (rise time) τon in shifting from the zero voltage period 7 to the voltage application period 5 was 0.5 msec., and the response time (decay time) τoff in shifting from the voltage application period 5 to the zero voltage period 7 was 4.1 msec. The light transmission before a start time, i.e., light transmission Tno in an initial state, was 32%, while light transmission Toff in the zero voltage period 7 during driving was 32%. On the other hand, light transmission Ton in the voltage application period 5 was 0.1%. Thus, the contrast ratio Toff/Ton was 32/0.15=213.

The pretilt angle θ of liquid crystal molecules in FIG. 1 was 5°.

The viscosity η of the liquid crystal material employed in this Example was 19 cP (20° C.), and its elastic coefficient ratio K33/K11 was 1.27.

In the conventional liquid crystal shutter shown in FIG. 16, the twist angle θ is 270°, the thickness d of the liquid crystal layer is 8 μm, and the chiral pitch p of the liquid crystal material is 10.7 μm. Thus, this liquid crystal shutter has the relation of θ/360°=d/p. In a sample of the conventional liquid crystal shutter shown in FIG. 16, the response time τoff shifting from the voltage application period to the zero voltage period was 6 msec. In Example shown in FIG. 1, therefore, the response time was reduced to about ⅔, thereby to improve the darkened picture portion in an upper area of the display unit.

In the present invention, the zero voltage period is preferably set at an integral times of 1V (one vertical scanning interval). In particular, this period is preferably set at about 1V of a high precision picture display unit having a high frequency.

Figure 2:
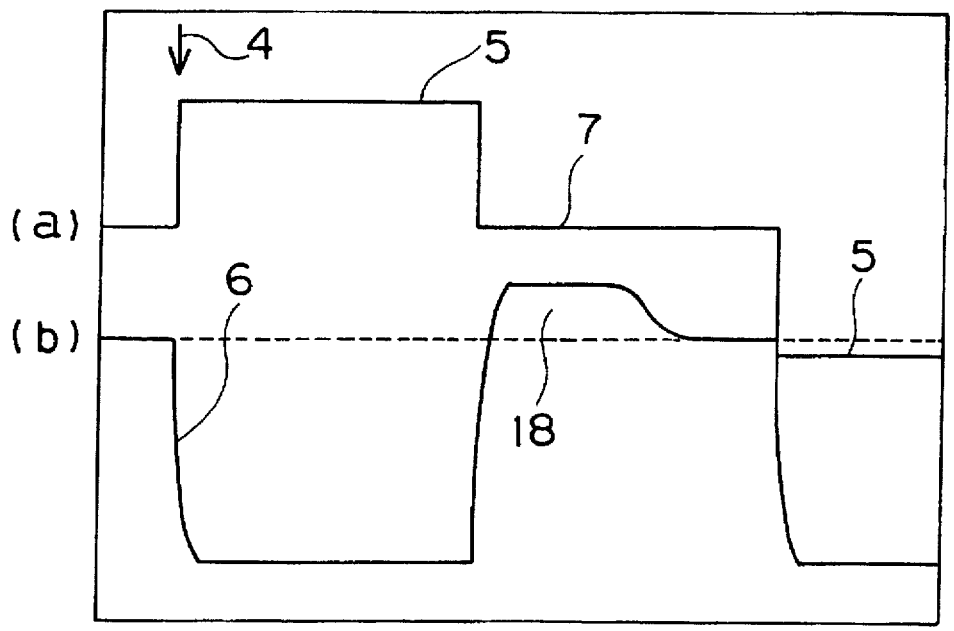
FIG. 2 illustrates changes of voltages applied to a liquid crystal in a liquid crystal shutter according to another Example of the present invention and following changes of light transmission.

FIG. 2 illustrates changes of voltages applied to a liquid crystal in a liquid crystal shutter according to another Example of the present invention and following changes of light transmission. In this Example, the thickness d of the liquid crystal layer was set at 6.5 μm, the chiral pitch p of the liquid crystal material was set at 7 μm, and the twist angle θ was set at 270°. Thus, the ratio d/p was 6.5/7=0.93, and the ratio θ/360° was 270°/360°=0.75. Thus, the relation of θ/360°<d/p was satisfied. The pretilt angle θ of liquid crystal molecules was 5°.

It is understood from FIG. 2 that light transmission 6 was steeply changed in shifting from a voltage application period 5 to a zero voltage period 7. In this Example, further, the light transmission 6 was increased in an initial stage of the zero voltage period 7 by an increment of 18. Therefore, the light transmission in the zero voltage period 7 was higher than that in an initial state.

Each of the voltage application periods 5 and 7 was 16.7 msec., and the frequency of the applied voltages was set at 30 Hz, similarly to that in FIG. 1.

The response time τon from the zero voltage period 7 to the voltage application period 5 was 0.3 msec., the response time τoff from the voltage application period 5 to the zero voltage period 7 was 3.0 msec., initial light transmission Tno was 25%, average light transmission Toff in the zero voltage period 7 was 32%, and light transmission Ton in the voltage application period 5 was 0.15%. Therefore, the contrast ratio Toff/Ton was 32/0.15=213. Thus, the response time τoff was reduced to about a half, while the light transmission was improved by 28% in the liquid crystal shutter according to this Example.

The viscosity η of the liquid crystal material employed in this Example was 19.7 cP (20° C.), and its elastic coefficient ratio K33/K11 was 1.46.

Figure 3:
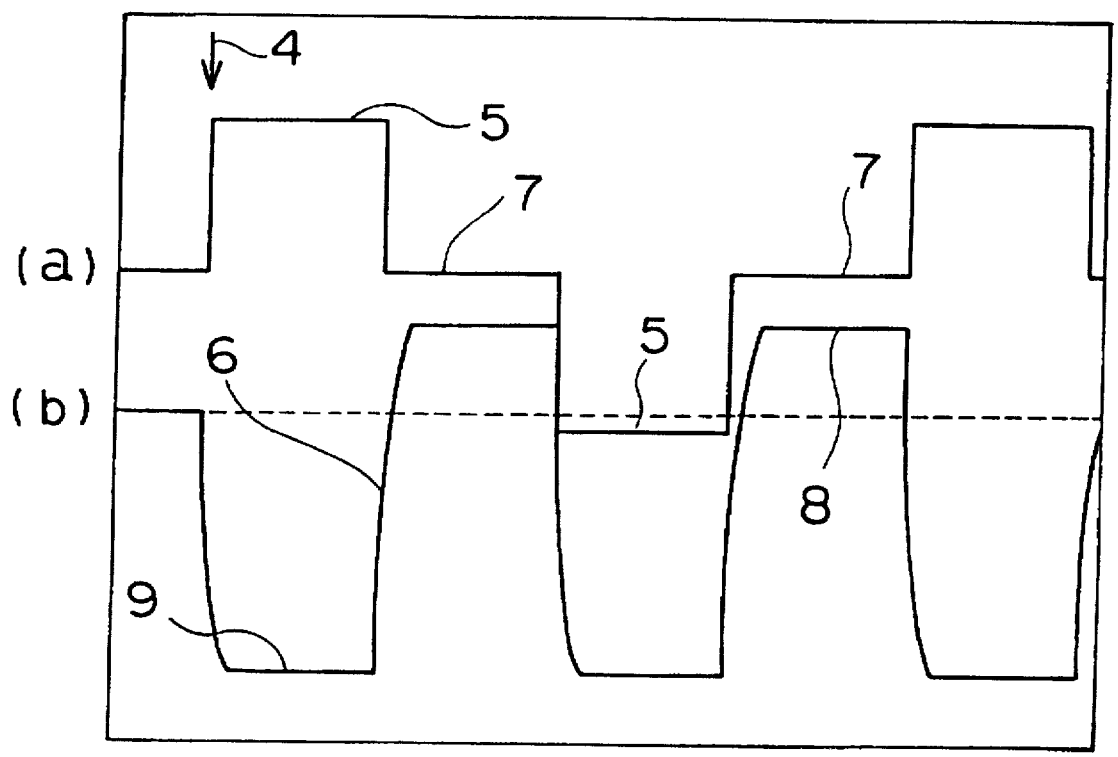
FIG. 3 illustrates changes of voltages applied to a liquid crystal in a liquid crystal shutter according to still another Example of the present invention and following changes of light transmission.

FIG. 3 illustrates changes of voltages applied to a liquid crystal in case of driving at a high frequency liquid crystal shutter employing an STN type liquid crystal described with reference to FIG. 2 and following changes of light transmission. In Example shown in FIG. 3, each of a voltage application period 5 and a zero voltage period 7 was set at 8.3 msec. Therefore, the frequency of an applied voltage having a cycle defined by the voltage application period 5 and the zero voltage period 7 was 60 Hz.

As shown in FIG. 3, no reduction of the light transmission in the zero voltage period 7 by a time lapse shown in FIG. 2 was recognized due to the increase of the driving frequency from 30 Hz to 60 Hz. Thus, the light transmission was not substantially reduced in the zero voltage period 7, whereby it was possible to higher light transmission in a more stable state, so that the darkened picture portion in the upper area of the display unit was not observed.

The response time τon was 0.3 msec., the response time τoff was 3.0 msec., the initial light transmission Tno was 25%, the light transmission Toff in the zero voltage period 7 was 35%, and the light transmission Ton in the voltage application period 5 was 0.15%. Therefore, the contrast ratio Toff/Ton was 35/0.15=233. Thus, it was possible to reduce the response time τoff to about a half, while improving the light transmission by 40%.

While each of the aforementioned Examples directs to an STN mode employing the nematic liquid crystal, an effect similar to the above can be attained also in case of a TN mode employing the nematic liquid crystal.

A liquid crystal layer having a thickness d of 4 μm, a chiral pitch p of 15 μm and a twist angle θ of 90° was employed to form a liquid crystal shutter. Therefore, the ratio d/p was 4/15=0.27, and the ratio θ/360° was 90°/360°=0.25. Thus, the relation of θ/360°<d/p was satisfied.

It was observed that the light transmission in the zero voltage period 7 was increased as compared with that in the initial state by driving the liquid crystal shutter at a frequency of 60 Hz, similarly to Example shown in FIG. 3. No substantial reduction of the light transmission was recognized in the zero voltage period 7.

The response time τon was 0.2 msec., and the response time τoff was 5.8 msec. The light transmission Tno in the initial state was 26%, the light transmission Toff in the zero voltage period 7 was 28%, and the light transmission Ton in the voltage application period was 0.09%. Therefore, the contrast ratio Toff/Ton was 28/0.09=311. The response time Ton was 11 msec. in the conventional liquid crystal shutter satisfying the relation θ/360°=d/p, and hence it was possible to reduce the response time to about a half according to the present invention. Further, it was possible to improve the light transmission by 7%.

The viscosity η of the liquid crystal material employed in this Example was 14 cP (20° C.), and its elastic coefficient ratio K33/K11 was 1.23.

Comparing the TN and STN modes with each other, the TN mode has a response time τoff of 5.8 msec., while that of the STN mode is 3.0 msec. On the other hand, the TN mode has light transmission of 28% in the zero voltage period, while that of the STN mode is 35%. Thus, it is understood that the STN mode exhibits more preferable characteristics than the TN mode, for serving as the style for a liquid crystal shutter.

Figure 4:
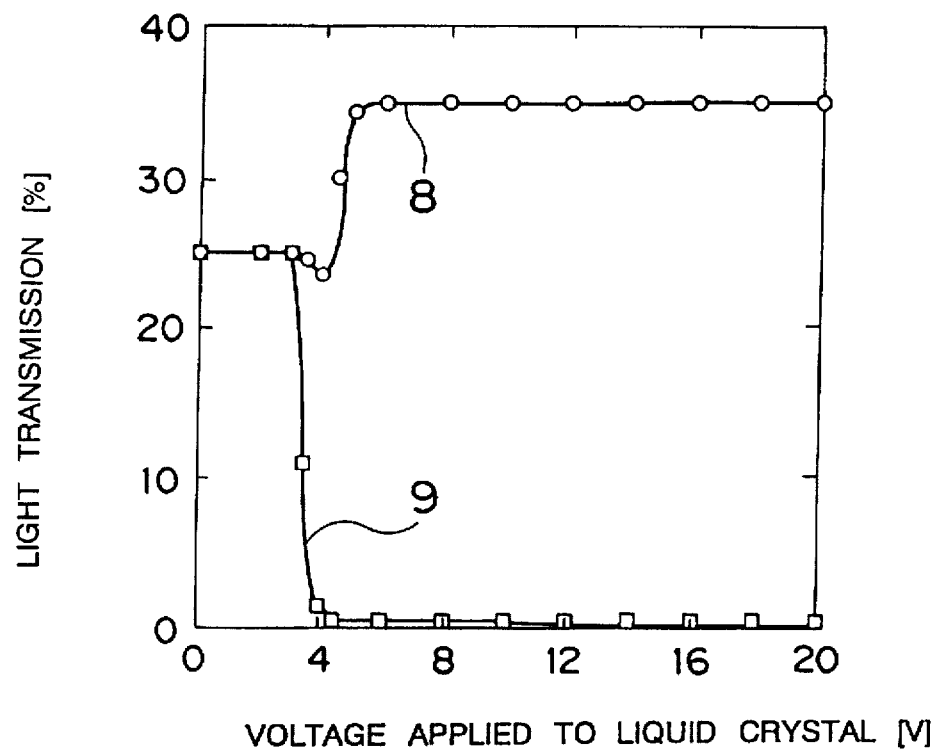
FIG. 4 illustrates the relation between voltages applied to a liquid crystal and light transmission in the present invention.

FIG. 4 illustrates the relation between voltages applied to the liquid crystal shutter employing an STN mode described with reference to FIG. 3 and light transmission. It is understood from FIG. 4 that light transmission 9 in a voltage application period is not more than 1% while light transmission 8 in a zero voltage period is about 35% when the applied voltage to the liquid crystal exceeds 5 V, whereby a higher contrast is attained.

As understood from FIG. 4, the light transmission is about 25% in an initial state before starting of driving, and the light transmission 8 in the zero voltage period during driving is higher than that in the initial state. As to the relation between the light transmission 8 in the zero voltage period and the applied voltages, the light transmission 8 is temporarily reduced in the range of the applied voltages of 3.7 to 4 V, while the same is increased in the range of 4 to 4.8 V, to reach the constant value of 35% under the voltages exceeding 5 V.

On the other hand, it is understood that the light transmission 9 in the voltage application period is reduced from a voltage around 4 V, and the liquid crystal molecules are perpendicularly oriented by voltage application to reduce the light transmission 9. It is also understood that the light transmission 9 reaches 1% under applied voltages exceeding 5 V, and is reduced below 0.2% under an applied voltage of 20 V, to be substantially saturated.

The preferred embodiment of the present invention is characterized in the phenomenon that the light transmission in the zero voltage period is higher than that in the initial state. The reason why this phenomenon takes place and the function/effect of the present invention increasing the speed of response from the voltage application period to the zero voltage period are now described.

Figure 7:
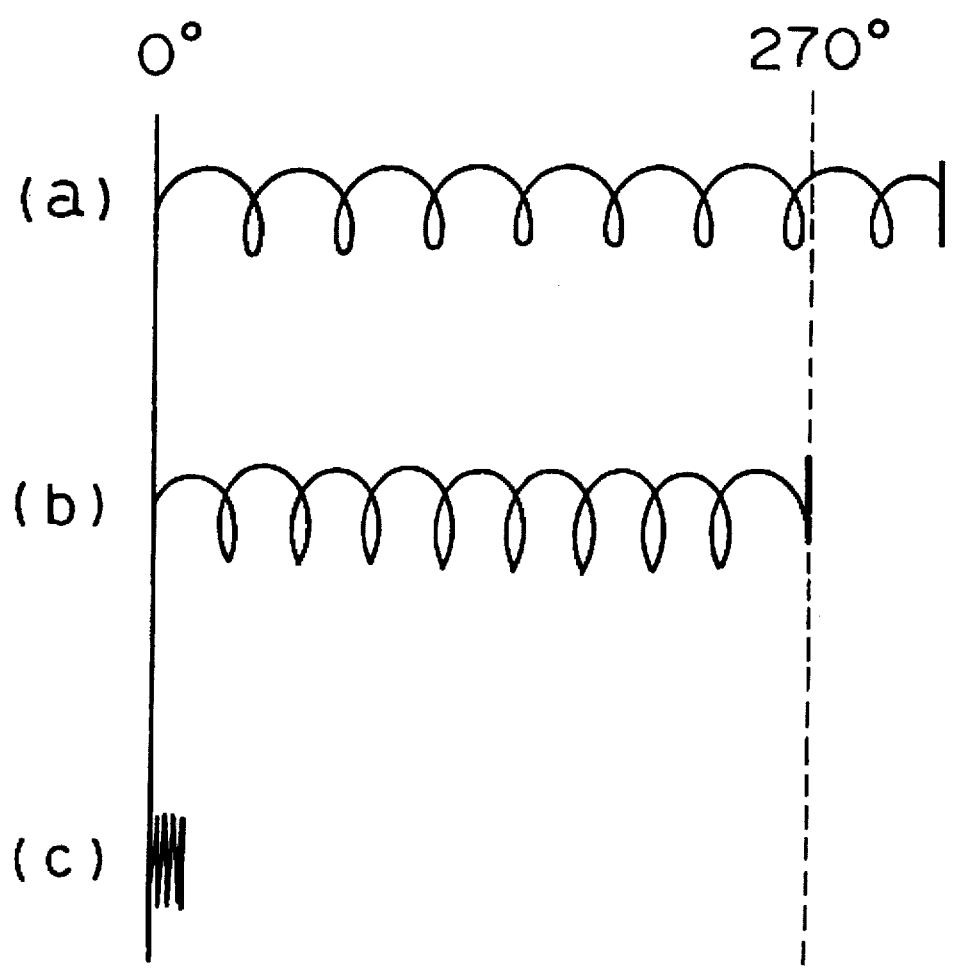
FIG. 7 is adapted to illustrate a twisted state of a liquid crystal in the present invention.

FIG. 7 is adapted to illustrate the twisted state of each liquid crystal molecule forming the liquid crystal layer as expansion/contraction of a spring. According to the present invention, the thickness d of the liquid crystal layer, the chiral pitch p of the liquid crystal material and the twist angle θ are set to satisfy the relation of θ/360°<d/p. This relation means that the twist angle θ, which must be set at a higher value in view of the original chiral pitch p of the liquid crystal material, is set at a smaller value. This corresponds to employment of a spring, which is longer than a length corresponding to 270° in a state supplied with no force as shown at (a) in FIG. 7, in a state forcibly brought into the length corresponding to 270° as shown at (b) in FIG. 7. The state shown at (b) in FIG. 7 corresponds to the initial state of the liquid crystal shutter. When a voltage is applied to the liquid crystal layer in this state, the liquid crystal molecules are substantially perpendicularly oriented at a twist angle of 0°. This corresponds to a state of applying large force for compressing the spring so that its length is substantially zero, as shown at (c) in FIG. 7.

When application of the voltage is stopped to shift to the zero voltage period, the spring is to return to the original length by its own elastic force. In this case, it is presumed that the spring itself temporarily reaches its original length exceeding the length corresponding to 270° and then returns to the length corresponding to 270° shown at (b) in FIG. 7 after a while. Therefore, it is conceivable that the light transmission in the zero voltage period is higher than that in the initial state since the spring temporarily exceeds the length corresponding to 270° in shifting to the zero voltage period. Thus, it is conceivable that the light transmission is temporarily increased in the zero voltage period on the basis of this phenomenon and gradually reduced in the zero voltage period in correspondence to the return of the spring to the length corresponding to 270°, as shown in FIG. 2.

Further, it is conceivable that reduction of the light transmission in the zero voltage period is substantially eliminated when the frequency is increased as shown in FIG. 3, in correspondence to such expansion/contraction of the spring in a faster cycle, in which the spring enters into the next voltage application period before returning to the length corresponding to 270° from the length exceeding the length corresponding to 270°.

Figure 8:
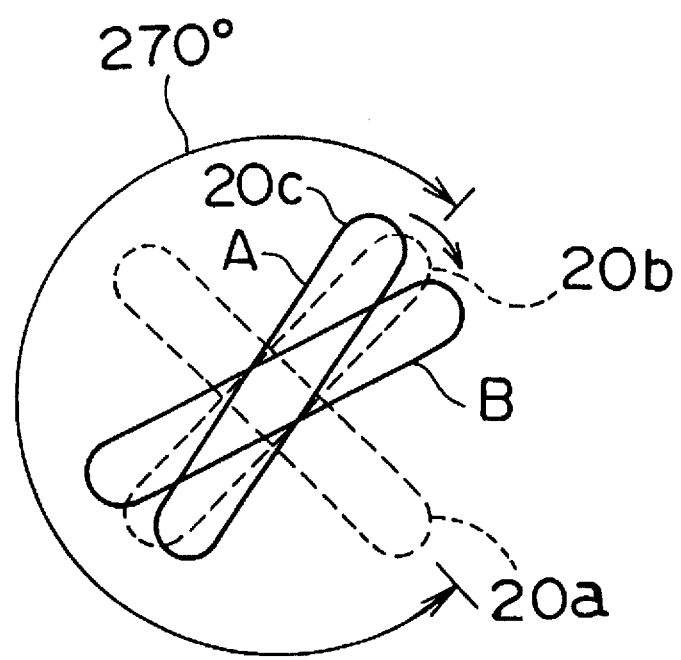
FIG. 8 is a plan view for illustrating twisting at an angle exceeding a twist angle θ in a zero voltage period in the inventive liquid crystal shutter.

FIG. 8 is a plan view for illustrating the phenomenon described with reference to FIG. 7 as twisted states of liquid crystal molecules. Referring to FIG. 8, liquid crystal molecules 20a and 20b are in contact with upper and lower alignment layers respectively. As shown in FIG. 8, the liquid crystal molecules forming a liquid crystal layer are twisted from the state of the liquid crystal molecule 20a to that of the liquid crystal molecule 20b at 270° along the thickness direction of the liquid crystal layer. A liquid crystal molecule 20c, which is located above the liquid crystal molecule 20b, is not directly influenced by the alignment layers and hence easier to move than the liquid crystal molecule 20b. In an initial state before driving of the liquid crystal shutter, the liquid crystal molecule 20c is positioned in a state A at a smaller twist angle than the liquid crystal molecule 20b. When a prescribed voltage is applied to the liquid crystal shutter at a prescribed frequency for driving the same, the liquid crystal molecule 20c, which is originally to exhibit a state at a larger twist angle, conceivably passes through the position A in the initial state and is twisted to a position B of a larger twist angle in shifting from the voltage application period to a zero voltage period. It is conceivable that the light transmission in the zero voltage period exceeds that in the initial state due to such a phenomenon.

It is also conceivable that the liquid crystal molecule 20c returns to the original state at a higher speed in shifting to the zero voltage period, whereby the speed of response is increased as compared with the prior art.

Figure 9:
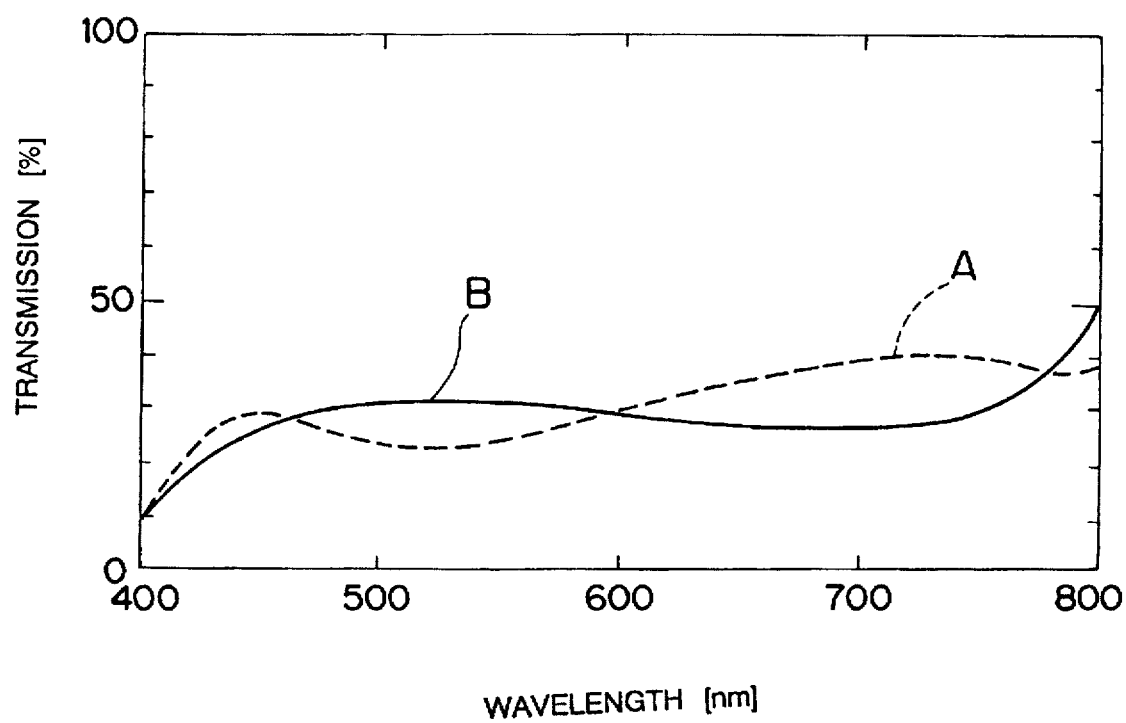
FIG. 9 illustrates the wavelength spectra of transmitted light in an initial state of the inventive liquid crystal shutter and that in a zero voltage period upon driving of the liquid crystal shutter.

FIG. 9 illustrates the wavelength spectra of transmitted light in the liquid crystal shutter employing an STN mode described with reference to FIG. 3. Symbol A denotes the waveform spectrum in an initial state before driving of the liquid crystal shutter, and symbol B denotes that in a zero voltage period during driving. As shown in FIG. 9, the wavelength spectrum B in the zero voltage period has high light transmission around 550 nm corresponding to green light. As compared with the wavelength spectrum A in the initial state, the wavelength spectrum B in the zero voltage period has light transmission of homogeneous distribution in the region of visible light (400 nm to 700 nm), while the wavelength spectrum A in the initial state exhibits inhomogeneous spectral distribution having high light transmission of red light. Thus, it is understood that light transmitted through the liquid crystal shutter according to the present invention is achromatic transmitted light which is hard to color.

Further, it is understood that the wavelength spectrum A in the initial state exhibits high transmittance in the region of infrared light which is out of that of visible light, while the wavelength spectrum B in the zero voltage period exhibits high light transmission in the region of visible light. It is conceivable that the light transmission in the zero voltage period is thus increased as compared with that in the initial state in the liquid crystal shutter according to the preferred embodiment of the present invention.

Figure 10:
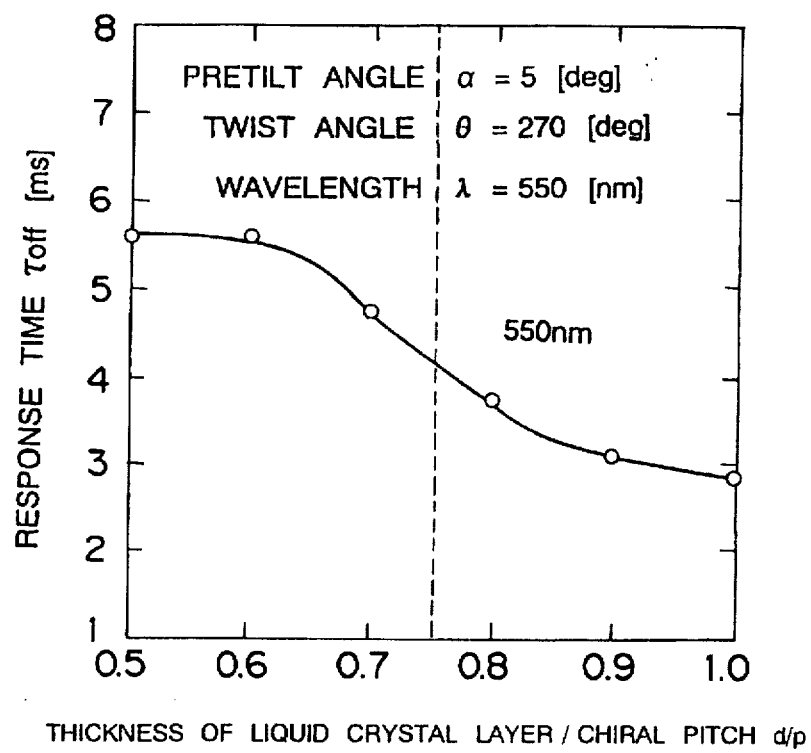
FIG. 10 illustrates the relation between the ratios of the thickness of a liquid crystal to the twist pitch and response times of light transmission changes.

FIG. 10 illustrates response times of transmittance changes of light of 500 nm in wavelength upon changes of the ratio d/p of the thickness d of the liquid crystal layer to the chiral pitch p of the liquid crystal material from 0.5 to 1.0. The light of 500 nm in wavelength has the highest visibility for human eyes.

An STN mode having a chiral pitch p of 7 μm was employed and so oriented that a pretilt angle of liquid crystal molecules on alignment layers were 5° at a temperature of 20° C., while the ratio d/p was changed by changing the thickness d of the liquid crystal layer.

It is clearly understood from FIG. 10 that the response time is reduced when the ratio d/p exceeds 0.75. The twist angle θ is 270° and hence 270°/360°=0.75. Thus, it is understood possible to reduce the response time τoff for opening/closing the liquid crystal shutter at a higher speed by satisfying the relation of θ/360°<d/p according to the present invention.

Figure 11:
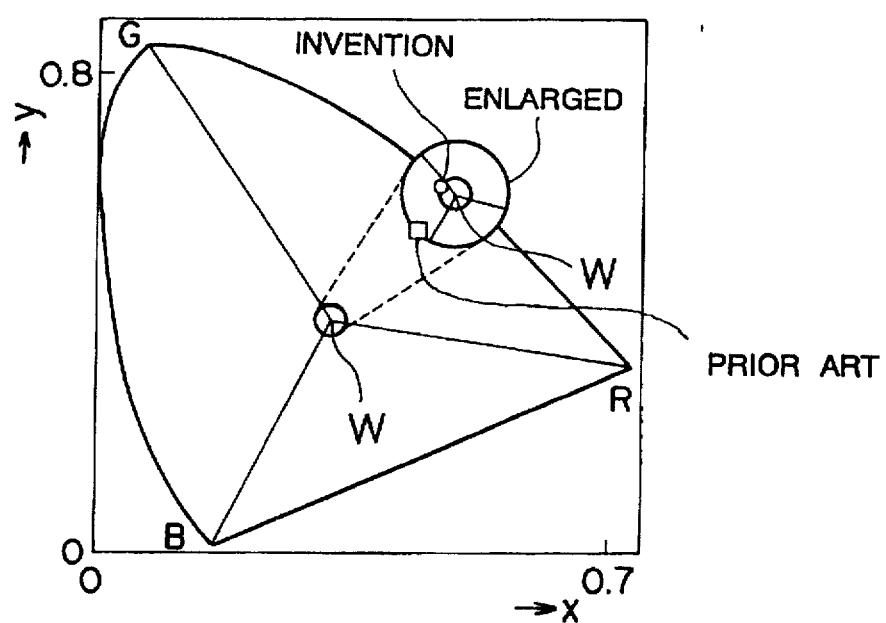
FIG. 11 illustrates a CIE standard chromaticity coordinate system of light transmitted through the inventive liquid crystal shutter.

FIG. 11 illustrates a CIE standard chromaticity coordinate system of light transmitted through the inventive liquid crystal shutter. Referring to FIG. 11, symbols B, G and R in the left lower, left upper and right center portions denote blue light, green light and red light respectively. An intersection of three lines extending from the positions B, G and R toward the center of the figure corresponds to white light W.

Referring to FIG. 11, a portion around the white light W is further enlarged. A circle indicates light transmitted through the inventive liquid crystal shutter, and a square indicates that through a conventional liquid crystal shutter. It is understood that the light transmitted through the inventive liquid crystal shutter is closer to the white light W as compared with that through the conventional shutter. It is understood that the light transmitted through the inventive liquid crystal shutter, which is expressed as (0.316, 0.342) in the CIE standard chromaticity coordinate system (x, y), is substantially achromatic, while that through the conventional shutter, which is expressed as (0.309, 0.337), appears slightly bluey.

When the inventive liquid crystal shutter is employed, therefore, it is not necessary to employ a retardation plate, which has been required in general.

The liquid crystal employed in each of FIGS. 2 and 3 exhibited a spray elastic coefficient K11 of $1.21 \times 10^{-11}$N, and a bend elastic coefficient K33 of $1.77 \times 10^{-11}$N.

Assuming that V50 and V10 represent voltages at light transmission levels of 50% and 10% respectively, a steep constant γ is expressed as γ=V50/V10. As the steep constant γ is reduced, the light transmission is abruptly changed with respect to the voltage applied to the liquid crystal. The steep constant γ of the STN mode is smaller than that of the TN mode. Further, the steep constant γ is inversely proportional to the elastic coefficient ratio K33/K11. Therefore, it is possible to reduce the steep constant γ by employing a liquid crystal material having a large elastic coefficient ratio K33/K11.

It has been experimentally recognized that the steep constant γ is reduced when the driving frequency f for the liquid crystal is in excess of a frequency satisfying f/(K33/K11)>1 sec./(8.3 msec.+8.3 msec.)/($1.77 \times 10^{-11}/1.21 \times 10^{-11}$) =41.2 Hz in the range of $0.6 \leq K33/K11 \leq 2.9$.

It has also been recognized that the liquid crystal shutter can be driven at a high speed when the product t·η of the zero voltage period t and the viscosity η is not more than 8.3 msec.×19.7 cP=$8.3 \times 10^{-3}$ sec.×$19.7 \times 10^{-2} \times 10^{-1}$ Pa·sec.= $1.64 \times 10^{-4}$ Pa·sec.$^2$ in the range of $3 \leq \eta \leq 35$ mPa·sec.

Figure 12:
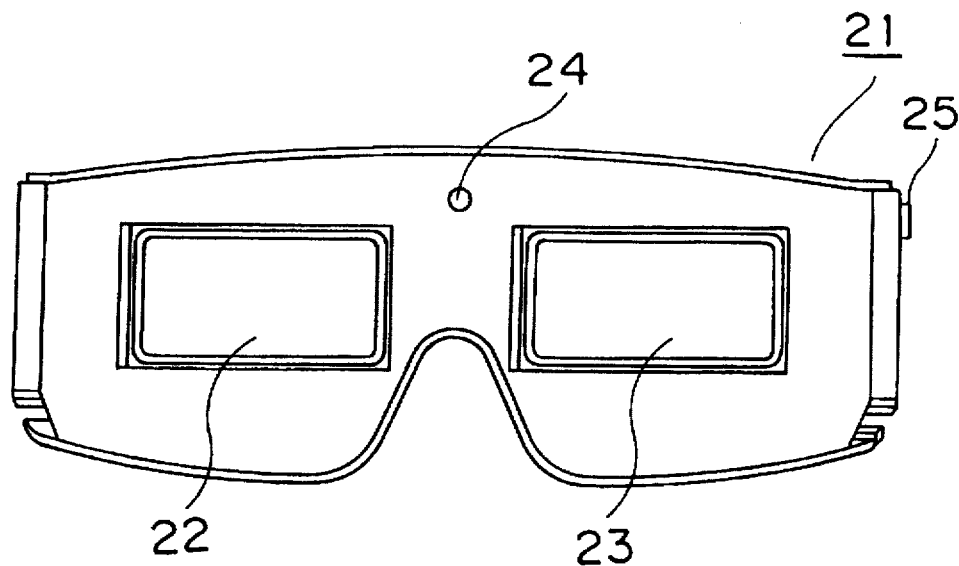
FIG. 12 is a front elevational view showing liquid crystal shutter glasses according to another embodiment employing the inventive liquid crystal shutters.

FIG. 12 is a front elevational view showing liquid crystal shutter glasses 21 employing liquid crystal shutters according to the present invention. Referring to FIG. 12, the liquid crystal shutter glasses 21 are provided with right and left eye shutters 22 and 23 consisting of the inventive liquid crystal shutters respectively. An infrared ray sensor 24 is provided in a region between the right and left eye shutters 22 and 23, for receiving code signals from a picture display unit. A pin jack 25 is provided on a left side frame, for receiving the code signals through a connection wire.

Figure 13:
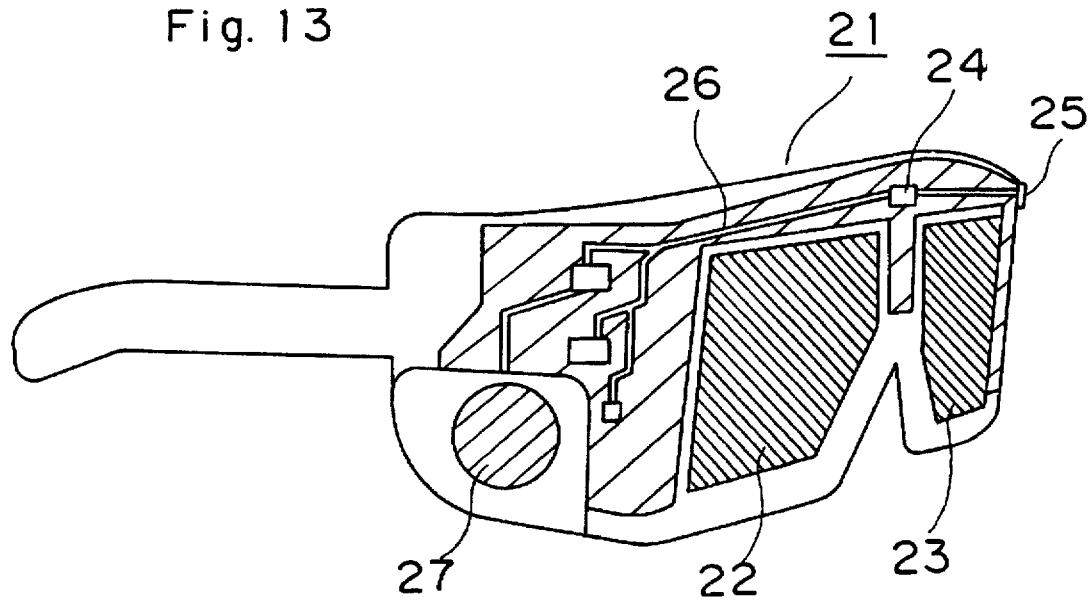
FIG. 13 is a perspective view for illustrating the internal structure of the liquid crystal shutter glasses shown in FIG. 12.

FIG. 13 is a perspective view for illustrating the internal structure of the liquid crystal shutter glasses 21 shown in FIG. 12. As shown in FIG. 13, a driving circuit 26 for driving the right and left eye shutters 22 and 23 are provided over peripheral and side frame portions. A battery 27 is provided on the side frame.

Figure 14:
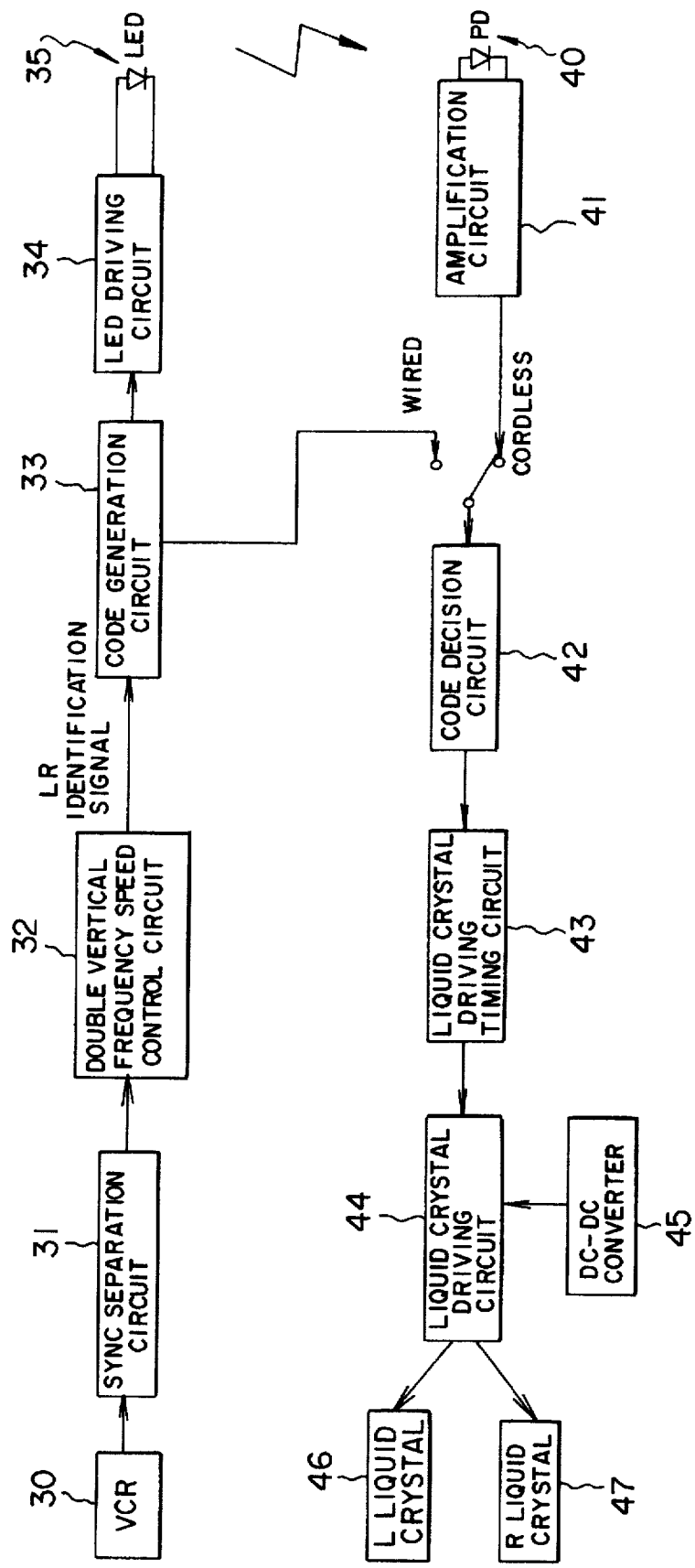
FIG. 14 is a block diagram showing the driving circuit for the liquid crystal shutter glasses shown in FIGS. 12 and 13.

FIG. 14 is a circuit block diagram showing a circuit for supplying signals for driving opening/closing operations of the liquid crystal shutter glasses 21 from the picture display unit to the liquid crystal shutter glasses 21. A sync separation circuit 31 extracts a vertical synchronizing signal from picture signals of a VTR 30. When the signal is at 60 Hz, for example, divided synchronizing signals for the right and left eyes are at 30 Hz, and hence the frequency is doubled by a double speed control circuit 32. Thus, R and L identification signals for the right and left eyes are supplied to a code generation circuit 33, to be converted to coded signals. An LED driving circuit 34 is driven by the coded signals, which in turn are supplied to a photodiode 40, serving as a sensor, from an LED 35 as infrared signals. The coded signals are amplified by an amplification circuit 41, and supplied to a code decision circuit 42. If the coded signals are directly supplied by the connection wire, the signals from the code generation circuit 33 are directly supplied to the code decision circuit 42. The code decision circuit 42 supplies the R and L signals to a liquid crystal driving timing circuit 43, which in turn drive a liquid crystal driving circuit 44 for applying voltages to R and L liquid crystal cells 47 and 46 which are liquid crystal shutters, for driving the same. A DC—DC converter 45 supplies a voltage to the liquid crystal driving circuit 44, in order to increase the driving voltages.

In the inventive liquid crystal shutter glasses, as hereinabove described, the opening/closing operations are performed in synchronization with the synchronizing signals which are supplied from the picture display unit, so that right and left eye pictures which are displayed on the picture display unit can be observed with only the right and left eyes respectively.

While each of the above embodiments has been described with reference to a liquid crystal shutter of an NO mode which enters a closed state having low light transmission with application of a voltage to the liquid crystal, the present invention is not restricted to this but also applicable to a liquid crystal shutter of an NC mode which enters an open state having high light transmission with application of a voltage to a liquid crystal.

Figure 15:
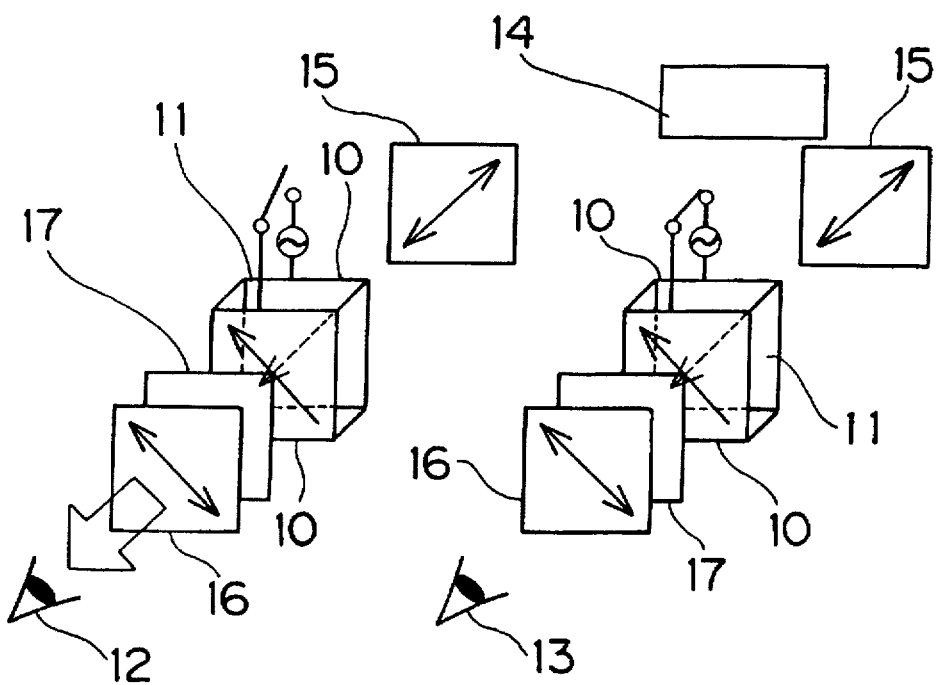
FIG. 15 is adapted to illustrate the structure of a liquid crystal shutter according to still another embodiment of the present invention.

While the rubbing directions of the pair of alignment layers holding the liquid crystal layer are perpendicularly to each other in general as hereinabove described, a high-speed response can be attained also when the rubbing directions are displaced within 10° from such angles. In this case, however, it may be necessary to employ retardation plates 17 between STN type liquid crystal 11 and front polarizing plates 16, as shown in FIG. 15.

It is possible to attain a response at a higher speed for improving the contrast in an open/closed state by employing the liquid crystal shutter according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal shutter comprising:

a pair of transparent substrates;

a pair of transparent electrodes being provided inside said pair of transparent substrates to be opposed to each other;

a liquid crystal layer being arranged between said pair of transparent electrodes; and a pair of alignment layers being provided on both sides of said liquid crystal layer for aligning liquid crystal molecules of said liquid crystal layer, a liquid crystal material forming said liquid crystal layer being prepared from a nematic liquid crystal, the ratio d/p of the thickness d of said liquid crystal layer to the chiral pitch p of said liquid crystal material and a twist angle θ being set by said pair of alignment layers for said liquid crystal molecules of said liquid crystal layer satisfying the relation of $\theta/360° < d/p$, wherein said shutter alternates a voltage application period of applying a voltage exceeding the threshold voltage of said liquid crystal layer and a zero voltage period of not applying said voltage, and wherein a driving frequency f is in excess of a frequency satisfying $f/(K_{33}/K_{11}) > 41.2$ Hz in the range of $0.6 \leq K_{33}/K_{11} \leq 2.9$.

2. The liquid crystal shutter in accordance with claim 1, wherein said liquid crystal molecules of said liquid crystal layer are substantially perpendicularly aligned at a twist angle of 0° in said voltage application period, while being twisted at an angle exceeding said twist angle $\theta$ in said zero voltage period.

3. The liquid crystal shutter in accordance with claim 1, wherein said twist angle $\theta$ of said liquid crystal layer is about 270°.

4. The liquid crystal shutter in accordance with claim 1, wherein said twist angle $\theta$ of said liquid crystal layer is about 90°.

5. The liquid crystal shutter in accordance with claim 1, being provided as each of right and left eye shutters of liquid crystal shutter glasses, said right and left eye shutters being driven to be alternately closed in a prescribed cycle.

6. A picture display observation system comprising:
the liquid crystal shutter glasses in accordance with claim 5; and
a picture display unit alternately displaying right and left eye pictures,
said liquid crystal shutter glasses being so driven as to close said right eye shutter in a period when said picture display unit displays a left eye picture while closing said left eye shutter in a period when said picture display unit displays a right eye picture.

7. The picture display observation system in accordance with claim 6, being a system for stereoscopically observing pictures.

8. A liquid crystal shutter comprising:
a pair of transparent substrates;
a pair of transparent electrodes being provided inside said pair of transparent substrates to be opposed to each other;
a liquid crystal layer being arranged between said pair of transparent electrodes; and
a pair of alignment layers being provided on both sides of said liquid crystal layer for aligning liquid crystal molecules of said liquid crystal layer,
a liquid crystal material forming said liquid crystal layer being prepared from a nematic liquid crystal, the ratio d/p of the thickness d of said liquid crystal layer to the chiral pitch p of said liquid crystal material and a twist angle $\theta$ being set by said pair of alignment layers for said liquid crystal molecules of said liquid crystal layer satisfying the relation of $\theta/360° < d/p$, wherein said shutter alternates a voltage application period of applying a voltage exceeding the threshold voltage of said liquid crystal layer and a zero voltage period of not applying said voltage, and wherein a product $t \cdot \eta$ of the zero voltage period t and the viscosity $\eta$ is not more than $1.64 \times 10^{-4}$ Pa·sec.$^2$ in the range of $3 \leq \eta \leq 35$ mPa·sec.

9. The liquid crystal shutter in accordance with claim 8, wherein said liquid crystal molecules of said liquid crystal layer are substantially perpendicularly aligned at a twist angle of 0° in said voltage application period, while being twisted at an angle exceeding said twist angle $\theta$ in said zero voltage period.

10. The liquid crystal shutter in accordance with claim 8, wherein said twist angle $\theta$ of said liquid crystal layer is about 270°.

11. The liquid crystal shutter in accordance with claim 8, wherein said twist angle $\theta$ of said liquid crystal layer is about 90°.

12. The liquid crystal shutter in accordance with claim 8, being provided as each of right and left eye shutters of liquid crystal shutter glasses, said right and left eye shutters being driven to be alternately closed in a prescribed cycle.

13. A picture display observation system comprising:
the liquid crystal shutter glasses in accordance with claim 12; and
a picture display unit alternately displaying right and left eye pictures,
said liquid crystal shutter glasses being so driven as to close said right eye shutter in a period when said picture display unit displays a left eye picture while closing said left eye shutter in a period when said picture display unit displays a right eye picture.

14. The picture display observation system in accordance with claim 13, being a system for stereoscopically observing pictures.

* * * * *